Patented Nov. 7, 1933

1,933,815

UNITED STATES PATENT OFFICE

1,933,815

PROCESS OF MAKING MIXED CELLULOSE ESTERS

Carl J. Malm, Rochester, N. Y., and Charles E. Waring, Dayton, Ohio, assignors to Eastman Kodak Company, Rochester, N. Y., a corporation of New York No Drawing. Application January 15, 1931
Serial No. 509,031

14 Claims. (Cl. 260—101)

This invention relates to a process of making mixed cellulose esters containing a higher acyl group either saturated, unsaturated or halogenated by treating a cellulose ester with a higher acyl anhydride and a liquid in which the anhydride is soluble but the cellulose ester or the finished product is insoluble and preferably in the presence of a catalyst. The halogenated acyl esters may be made by introducing an unsaturated acyl group in this manner and subsequently halogenating.

As shown by U. S. patent to Clarke and Malm No. 1,698,048, it has been previously known to treat acetone soluble cellulose acetate in a mixture of a higher fatty acid and chloracetic anhydride or in a mixture of a higher fatty acid anhydride and chloracetic acid. Free hydroxyl groups in the cellulose acetate are thus acylated and a solution of the mixed ester is obtained. As shown by U. S. patent to Clarke and Malm No. 1,687,060 it has been previously known to form a mixed ester of cellulose by treating it with acetic anhydride and an unsaturated acid in the presence of chloracetic acid and a catalyst. However with our process, operation is more simple and more economical even than the processes shown in these patents.

We have found that the same type of mixed esters disclosed in these previous patents can be made if the cellulose acetate is treated with a mixture containing a higher fatty acid anhydride either saturated or unsaturated, a catalyst, and an organic liquid or a composition of organic liquids which is a solvent for the higher fatty acid anhydride and the catalyst but not for the cellulose acetate nor for the resulting mixed ester. By carrying out the process in this way the free hydroxyl groups in the cellulose acetate are esterified by the higher fatty acid anhydride but the cellulose ester does not enter into the solution. If the halogenated acyl ester is desired the unsaturated acid anhydride is used and after the acylation the compound formed is then halogenated by which means the unsaturated bonds are taken up by halogen atoms. After the reaction is completed the ester formed may be filtered off and purified by extraction with an organic liquid or by washing with hot water or in any customary manner. The organic liquid used as a diluent has to be selected depending upon the higher fatty acid groups which are to be introduced in each individual case and upon the amount of acetyl which is present in the cellulose acetate. Any of the anhydrides of the higher fatty acids (higher than acetic) as well as those of other acids such as cyclo-hexane-carboxylic, benzoic and o-methoxy benzoic, o-chloro-benzoic, acetyl-salicylic, phenyl-acetic, hydro-cinnamic, cinnamic, crotonic and numerous other organic acid anhydrides may be used in place of the anhydrides which are given in the examples below. The catalyst that may be used in this process may be selected from the following: Sulfuric acid, hydrogen halide, organic sulphonic acid, phosphoric acid, sulfinic acid, chlorine, bromine or an iodine chloride and others. Also various organic sulphuryl compounds such as benzene-sulphuryl-chloride or the like may be used in this process.

For the production of the halogenated acyl ester any of the halogens are suitable for addition in the double or triple bond of the unsaturated acid. However chlorine or bromine are preferred for this purpose. The following examples are illustrative of our invention:

*Example 1.*—About 16 grams of a partially de-esterified cellulose acetate containing about 38% acetyl is placed in about 250 grams of toluene. The moisture present in the cellulose acetate is distilled off and about 75 grams of stearic anhydride, 5 grams of p-toluene-sulfo-chloride and 250 grams of ligroin (B. P. 90–120° C.) are added. The mixture is refluxed for from 15–30 hours, depending upon the speed of the reaction, after which the cellulose ester may be filtered off and washed with hot water if desired. A cellulose acetate—stearate containing about 30% stearyl is obtained.

*Example 2.*—About 15 grams of the same type of cellulose acetate used in Example 1 is refluxed for from 15–30 hours, with a mixture of approximately 250 grams of toluene, 15 grams of propionic anhydride, and 5 grams of pyridine. The cellulose ester obtained may then be filtered off and washed. In this way a cellulose acetate-propionate is obtained.

*Example 3.*—About 15 grams of cellulose acetate containing about 38% of acetyl is refluxed with about 500 c. c. of carbon tetrachloride containing approximately 15 grams of crotonic anhydride and a little p-toluene sulfo-chloride (about 2 grams) until the cellulosic hydroxyl groups have been esterified or until complete acylation. The time usually necessary for this operation is about 20–30 hours. After the reaction is completed the cellulose compound may be filtered off and washed in the usual manner or if subsequent halogenation is to be carried out the filtered compound is extracted with carbon tetrachloride and a halogen, preferably bromine (about 10–20 grams), is added. After standing for a time (usually 1-4 hours) at ordinary temperature, the cellulose compound may be separated from the liquid, extracted with carbon tetrachloride and dried or may be treated in any manner preferred. It was found that the product produced by this method contained about 25% of bromine.

Any of the compounds listed in the two patents cited above or a similar compound may be produced by the method of this invention. Any of the partially de-esterified fatty acid esters of cellulose may be used as the initial material instead of cellulose acetate if found more desirable.

An advantage of this process is that the cellulose ester does not enter into solution, it does not have to be isolated by precipitation but simply filtered off and extracted. The use of acid anhydride in acylation does not give rise to any new problem of handling as it is old and well known in the art to use anhydrides, for instance, acetic anhydride, for various reactions. Thus methods of handling acid anhydride are well known and the technique of procedure with these materials is well developed.

The solvents for the anhydride and catalyst that have been found most suitable in this process are toluene or other benzene hydrocarbons such as benzene, xylene, etc., or light petroleum distillates (pyridine is here a catalyst). The choice of solvents will depend upon the individual reaction. Thus in some cases halogenated hydrocarbons such as carbon tetrachlorid will be more suitable. It has been found that any organic solvent which answers the requirements of being a solvent for the catalyst and the acylating agent and a non-solvent of the cellulose ester and the mixed ester resulting from the reaction may be used.

While we have specified in the above examples that cellulose acetate having an acetyl content of approximately 38% was employed, this is only illustrative of a large class of cellulose acetates which may be employed. For instance, cellulose acetate which has been de-esterified to an acetyl content of from 42% to as low as 20% may be employed with equal success. The partially de-esterified cellulose acylates are those which have been completely esterified and then hydrolyzed. Cellulose triacetate which is hydrolyzed to acetone solubility is an example of this type of cellulose derivative.

What we now claim as our invention and desire to be secured by Letters Patent of the United States is:

1. A process of making mixed cellulose esters which comprises treating a partially de-esterified cellulose acylate of a saturated acid with an anhydride of a fatty acid different than that corresponding to the group already present in the cellulose ester in the presence of a catalyst and an organic liquid in which the anhydride and catalyst are soluble and the cellulose esters in the bath are insoluble.

2. A process of making mixed cellulose esters which comprises treating a partially de-esterified cellulose acylate of a saturated acid with an unsaturated fatty acid anhydride in the presence of a catalyst and an organic liquid in which the anhydride and catalyst are soluble and the cellulose esters in the bath are insoluble, and then halogenating the resulting product.

3. A process of making mixed cellulose esters which comprises treating a cellulose acetate containing 20-42% acetyl with a fatty acid anhydride different than acetic in the presence of a catalyst and an organic liquid in which the anhydride and the catalyst are soluble and the cellulose esters in the bath are insoluble.

4. A process of making halogenated cellulose esters which comprises treating cellulose acetate containing 20-42% acetyl with an unsaturated fatty acid anhydride in the presence of a catalyst and an organic liquid in which the anhydride and catalyst are soluble and the cellulose esters in the bath are insoluble and then halogenating the resulting product.

5. A process of making mixed cellulose esters which comprises treating a partially de-esterified cellulose acylate with an anhydride of a fatty acid different than that corresponding to the group already present in the cellulose ester in the presence of a catalyst and a liquid selected from the group consisting of toluene, carbon tetrachloride, toluene-light petroleum distillate, benzene-light petroleum distillate and xylene-light petroleum distillate.

6. A process of making halogenated cellulose esters which comprises treating a partially de-esterified cellulose acylate of a saturated acid with an unsaturated fatty acid anhydride in the presence of a catalyst and an organic liquid in which the anhydride and the catalyst are soluble and the cellulose esters in the bath are insoluble and then treating with bromine.

7. A process of making mixed cellulose acetate esters which comprises treating a cellulose acetate of about 20-42% acetyl content with an acid anhydride selected from the group consisting of stearic, propionic, lauric, oleic, cinnamic, cyclohexane-carboxylic, phenyl-acetic, o-chloro-benzoic and o-methoxy-benzoic, and a catalyst in the presence of an organic liquid in which the anhydride and the catalyst are soluble and the cellulose esters in the bath are insoluble and then treating with bromine.

8. A process of making mixed cellulose esters which comprises treating a partially de-esterified cellulose acetate with the anhydride of an acid selected from the group consisting of the acetic acid series and the oleic acid series, and a catalyst in the presence of an organic liquid in which the anhydride and the catalyst are soluble and the cellulose esters in the bath are insoluble and then treating with bromine.

9. A process of making cellulose acetate-stearate which comprises treating acetone soluble cellulose acetate with stearic anhydride and a catalyst in the presence of toluene and ligroin.

10. The process of making cellulose acetate-propionate which comprises treating acetone-soluble cellulose acetate with propionic anhydride in the presence of toluene and pyridine.

11. A process for making mixed halogenated cellulose esters from acetone-soluble cellulose acetate by treating it with a solution of an unsaturated acid anhydride selected from the group consisting of the oleic series and the cinnamic series and a catalyst in an organic liquid which is a solvent for the anhydride and catalyst and which is a non-solvent of the product formed and halogenating the resulting product.

12. A process for making mixed halogenated cellulose esters from acetone-soluble cellulose acetate by treating it with a solution of an unsaturated acid anhydride and a catalyst in an organic solvent which is a non-solvent of the product formed and subsequently treating with a substance selected from the group consisting of bromine, chlorine and iodine.

13. A process for making mixed, halogenated cellulose esters from acetone-soluble cellulose acetate by treating it with a solution of unsaturated acid anhydride selected from the group consisting of oleic, and cinnamic anhydride and a catalyst in an organic solvent which is a non-solvent of the product formed and subsequently treating with a substance selected from the group consisting of bromine, chlorine and iodine.

14. A process for making mixed halogenated cellulose esters from acetone-soluble cellulose acetate by treating it with an anhydride of unsaturated acid selected from the group consisting of the oleic and the cinnamic acids, and a catalyst in the presence of carbon-tetrachloride and then treating with a substance selected from the group consisting of bromine, chlorine and iodine.

CARL J. MALM.
CHARLES E. WARING.

CERTIFICATE OF CORRECTION.

Patent No. 1,933,815.  November 7, 1933.

CARL J. MALM, ET AL.

It is hereby certified that error appears in the printed specification of the above numbered patent requiring correction as follows: Page 2, line 57, claim 1, strike out the words "of a saturated acid"; and that the said Letters Patent should be read with this correction therein that the same may conform to the record of the case in the Patent Office.

Signed and sealed this 9th day of January, A. D. 1934.

F. M. Hopkins (Seal) Acting Commissioner of Patents.